United States Patent
Muhlhoff et al.

(10) Patent No.: US 10,308,076 B2
(45) Date of Patent: Jun. 4, 2019

(54) TIRE INCLUDING A HIGH-CONTRAST TEXTURE ON THE TREAD SURFACE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Olivier Muhlhoff, Clermont-Ferrand (FR); Jean-Claude Desvignes, Clermont-Ferrand (FR); Bernard Villeneuve, Clermont-Ferrand (FR); Anthony Gueugneau, Clermont-Ferrand (FR); Jonathan Lejeune, Clermont-Ferrand (FR); Julien Besset, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 213 days.

(21) Appl. No.: 15/122,454

(22) PCT Filed: Mar. 10, 2015

(86) PCT No.: PCT/EP2015/054939
§ 371 (c)(1),
(2) Date: Aug. 30, 2016

(87) PCT Pub. No.: WO2015/135930
PCT Pub. Date: Sep. 17, 2015

(65) Prior Publication Data
US 2017/0066288 A1     Mar. 9, 2017

(30) Foreign Application Priority Data
Mar. 10, 2014   (FR) ...................... 14 51918

(51) Int. Cl.
*B60C 11/03*     (2006.01)
*B60C 11/24*     (2006.01)
(Continued)

(52) U.S. Cl.
CPC .......... *B60C 11/0332* (2013.01); *B60C 11/00* (2013.01); *B60C 11/0008* (2013.01); *B60C 11/246* (2013.01); *B60C 2011/1245* (2013.01)

(58) Field of Classification Search
CPC ..... B60C 11/00; B60C 11/03; B60C 11/0332; B60C 11/0008; B60C 2011/0016;
(Continued)

(56) References Cited

U.S. PATENT DOCUMENTS

D79,685 S   * 10/1929  Hower .................. 152/209.15
D100,572 S  *  7/1936  Martin .................. 152/209.15
(Continued)

FOREIGN PATENT DOCUMENTS

EP     0 868 955     10/1998
EP     1 641 580     6/2004
(Continued)

*Primary Examiner* — Eric Hug
(74) *Attorney, Agent, or Firm* — Cozen O'Connor

(57) ABSTRACT

A tire (1) made of rubber material, comprising a tread (2), said tread having a tread surface (20) intended to come into contact with a road surface when the tire is being driven on, this tread surface having, in cross section, a certain curvature. The tread surface (20) comprises, over at least 80% of its surface, a texture (3) contrasting with the rest of the tire, this texture (3) having a plurality of elements that protrude from or are recessed into the tread surface (20), and each element extends perpendicularly (θ=90°) to the tread surface (20) along the curvature of this tread surface (20).

12 Claims, 5 Drawing Sheets

(51) Int. Cl.
*B60C 11/00* (2006.01)
*B60C 11/12* (2006.01)

(58) Field of Classification Search
CPC ......... B60C 2011/142; B60C 2011/042; B60C 11/24; B60C 11/246; B60C 11/032; B60C 11/0327; B60C 2011/0337
USPC .......................... 152/209.15, 209.16, 154.2
See application file for complete search history.

(56) References Cited

U.S. PATENT DOCUMENTS

| | | | | |
|---|---|---|---|---|
| 2,670,777 | A * | 3/1954 | Wallace | B60C 11/14 |
| | | | | 152/209.15 |
| 2,716,435 | A | 8/1955 | Herzegh | |
| 3,856,067 | A * | 12/1974 | Gorter | B60C 11/00 |
| | | | | 152/209.15 |
| 5,203,933 | A * | 4/1993 | Nagahisa | B60C 11/032 |
| | | | | 152/209.15 |
| 6,250,354 | B1 | 6/2001 | Kawai | |
| 6,575,215 | B1 * | 6/2003 | Hino | B29C 43/24 |
| | | | | 152/209.15 |
| 2003/0111150 | A1 * | 6/2003 | Zimmer | B60C 11/00 |
| | | | | 152/209.19 |
| 2009/0218019 | A1 * | 9/2009 | Paturle | B29C 33/424 |
| | | | | 152/209.18 |
| 2011/0220256 | A1 * | 9/2011 | Furusawa | B60C 11/12 |
| | | | | 152/209.17 |
| 2012/0080129 | A1 * | 4/2012 | Furusawa | B60C 11/032 |
| | | | | 152/209.15 |
| 2014/0305562 | A1 * | 10/2014 | Shiga | B60C 11/00 |
| | | | | 152/209.15 |

FOREIGN PATENT DOCUMENTS

| | | | |
|---|---|---|---|
| EP | 1 872 974 | 1/2008 | |
| JP | 62-64605 | 4/1987 | |
| JP | H 02 147411 | 6/1990 | |
| JP | 2009-512584 | 3/2009 | |
| JP | 2011-189779 | 9/2011 | |
| JP | 2012-076659 | 4/2012 | |
| JP | 2013-136281 | 7/2013 | |
| JP | 2013-169807 | 9/2013 | |
| WO | WO 2007/045425 | 4/2007 | |
| WO | WO 2012/171802 | 12/2012 | |
| WO | WO 2013/100199 * | 7/2013 | ............. B60C 11/00 |

* cited by examiner

TIRE INCLUDING A HIGH-CONTRAST TEXTURE ON THE TREAD SURFACE

RELATED APPLICATIONS

This is a U.S. National Phase Application under 35 U.S.C. 371 of International Application PCT/EP2015/054939 filed Mar. 10, 2015.

This application claims the priority of French application no. 1451918 filed Mar. 10, 2014, the entire content of which is hereby incorporated by reference.

FIELD OF THE INVENTION

The present invention relates to a motor vehicle tire having a tread, said tread having a tread surface.

BACKGROUND OF THE INVENTION

In order to mould the tread of a tire, it is known practice to use moulding elements fixed in a mould. What is meant by a moulding element is any element of the mould which has a moulding surface that allows part of the tread of a tire to be moulded. A moulding element can thus be a block fitted on a segment of the mould or else a rib attached to the radially inner surface of the mould.

It is possible to create a moulding element using a selective fusion method more commonly referred to as sintering. This method uses a beam of energy to fuse a metallic powder. A "beam of energy" means electromagnetic radiation (for example a laser beam) or a beam of particles (for example an electron beam).

A sintering method using a laser, referred to below as a laser sintering method, is known from document EP1641580. In that document, a first layer of metallic powder is spread on a plate. All or some of the particles of this first layer of powder are then agglomerated by the beam of a laser according to the shape of the object that is to be obtained. Once this step has been performed, a second layer of powder is spread on the first layer of powder so that it can be selectively fused in turn using the laser. By repeating these operations of spreading a layer and fusing using a laser, a sintered object is built up layer by layer.

Such a sintered object is shown notably in FIG. 3 of document EP0868955. In that figure, the layered structure of the sintered object is easily distinguished, said sintered object being a moulded element intended to be attached inside a mould for a tire. However, this layered structure causes level lines which are the mirror image of this structure to appear on the tread surface of the moulded tire. This phenomenon of level lines is augmented by the curvilinear nature of the mould. These level lines give the tire an unattractive appearance.

There is thus a need to provide a solution that makes it possible to keep using the laser sintering method in order to manufacture the mould for moulding the tire, while attempting to improve the appearance of the tire.

DEFINITIONS

A "tire" means all types of resilient tread, whether or not it is subjected to an internal pressure.

A "rubber material" means a diene elastomer, that is to say, in a known way, an elastomer which is based, at least partially (i.e. is a homopolymer or a copolymer), on diene monomers (monomers bearing two conjugated or non-conjugated carbon-carbon double bonds).

The "tread" of a tire means a quantity of rubber material delimited by lateral surfaces and by two main surfaces, one of which, referred to as the tread surface, is intended to come into contact with a road surface when the tire is being driven on.

A "texture" means an organized set of elements.

The "sidewall" of a tire means a lateral surface of the tire, said surface being disposed between the tread of the tire and a bead of this tire.

A "strand" means a filiform element, the height of which is at least equal to twice the diameter of a disc having the same surface area as the mean cross section of the strand.

"Lamellae" means elongate strands which have a length at least equal to twice their height.

SUMMARY OF THE INVENTION

One aspect of the invention relates to a tire made of rubber material, comprising a tread. This tread has a tread surface intended to come into contact with a road surface when the tire is being driven on, this tread surface having, in cross section, a certain curvature. The tread surface comprises, over at least 80% of its surface, a texture contrasting with the rest of the tire, this texture having a plurality of elements that protrude from or are recessed into the tread surface, and each element extends perpendicularly to the tread surface along the curvature of this tread surface.

By using a texture on the surface of the tread, the presence of level lines on this surface is thus concealed.

Furthermore, the texture formed by the protruding or recessed elements makes it possible to "trap" all or some of the incident light rays that strike the surface of the tread. This makes it possible to give this tread surface a blacker appearance and consequently this makes it possible to improve its contrast and thus its visibility with respect to the rest of the tire.

In a preferred embodiment, the texture has a lightness, known as first lightness $L^*1$, of between 6 and 15, and preferably between 8 and 9, and the rest of the tire has a lightness, known as second lightness $L^*2$, greater than or equal to 18 and less than or equal to 30.

In this way, it is possible to ensure that the texture contrasts strongly with the rest of the tire. "Lightness" means the parameter which characterizes the capacity of a surface to reflect light. Lightness is expressed here using a scale that ranges from 0 to 100 in accordance with the $L^*a^*b^*$ colour model adopted in 1976 by the International Commission on Illumination (CIE). The value 100 represents white or total reflection; the value 0 represents black or total absorption.

The lightness values $L^*1$ and $L^*2$ are determined using a spectrocolorimeter, for example a KONICA-MINOLTA CM 700D spectrocolorimeter. This appliance is positioned over the texture and the lightness $L^*1$ of this texture is measured. This measurement is taken notably using the SCI (specular component included) mode, set at an angle of 10° and with a D65 type light setting (setting as defined by the CIE).

In the same way, the appliance is positioned over another part of the tire in order to determine a lightness $L^*2$. In order to improve the determination of this lightness $L^*2$, it is possible to take a plurality of measurements on the tire and deduce a mean lightness associated with the rest of the tire therefrom. It will be noted that the rest of the tire consists of the regions of the tire that are not covered with the texture according to the invention, for example the sidewall of this tire.

In one non-limiting variant embodiment, at least 30% of the protruding elements of the texture form an angle α of greater than 40° with respect to a plane tangent to the tread surface, and at most 25% of the protruding elements of the texture form an angle α of less than 20° with respect to the tangent plane. In this way, the capacity of the texture to trap light is improved further.

In one non-limiting variant embodiment, all or some of the protruding elements are strands distributed through the texture at a density at least equal to one strand per square millimeter ($mm^2$), each strand having a mean cross section of between 0.003 $mm^2$ and 1 $mm^2$.

In another non-limiting variant embodiment, all or some of the protruding elements are substantially mutually parallel lamellae, the spacing of the lamellae in the texture being at most equal to 0.5 mm, each lamella having a mean width of between 0.03 mm and 0.25 mm.

In another non-limiting variant embodiment, all or some of the protruding elements form parallelepipeds having a side length of between 0.05 mm and 0.5 mm and a height of between 0.05 mm and 0.5 mm, the distance between two adjacent parallelepipeds in the texture being between 0.05 mm and 0.5 mm.

In another non-limiting variant embodiment, the protruding elements have variable shapes and distances between protruding elements in the texture.

This makes it possible to create randomness in the texture, making it possible to render these elements less visible.

In a second non-limiting embodiment, the recessed elements form openings in the tread surface and the texture comprises a plurality of openings, said openings being distributed through the texture at a density at least equal to one opening per square millimeter ($mm^2$), these openings having, at the tread surface, equivalent diameters of between 0.03 mm and 1.2 mm.

The texture is thus more durable. Specifically, since this texture is made up of elements that are recessed into the surface of the tread, the impact of a road surface rubbing against this texture is reduced.

In another embodiment, the texture present on the tread surface extends onto one sidewall of the tire.

In a preferred embodiment, the texture forms, on the sidewall of the tire, means for indicating overload and/or underinflation of this tire.

These means for indicating overload and/or underinflation are in the form of a plurality of textured regions on the sidewall, said textured regions being separated by non-textured regions, the textured regions of the sidewall continuing the texture present on the tread surface of the tire. It is thus possible for an observer to more easily determine the condition of the tire when stationary. If the part of the sidewall having the textured regions interrupted by the non-textured regions is visible, the tire can be considered to be in a good use state. By contrast, if this part of the sidewall is not visible, this indicates that the tire may be in a state of overload and/or underinflation.

BRIEF DESCRIPTION OF THE DRAWINGS

Other features and advantages of the invention will become apparent from the following description, given by way of non-limiting example, with reference to the attached drawings in which.

DETAILED DESCRIPTION OF THE DRAWINGS

In the following description, elements which are substantially identical or similar will be denoted by identical references.

Figure 1:
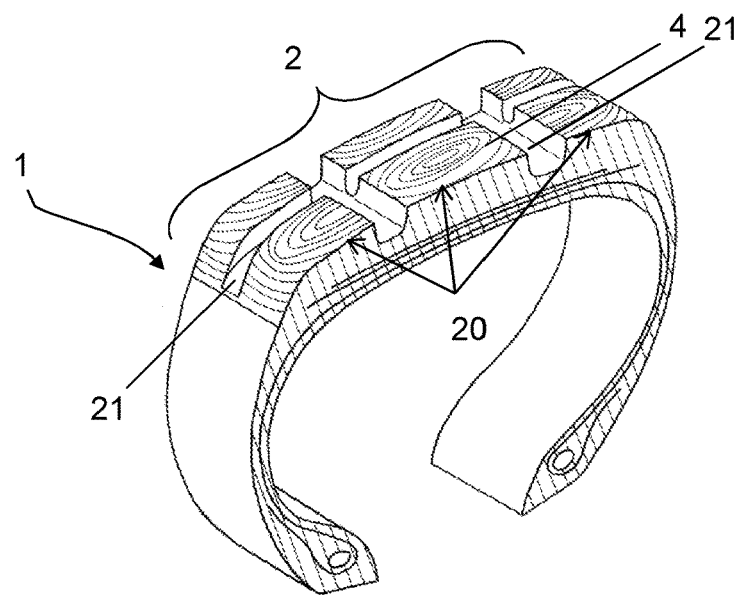
FIG. 1 schematically shows a perspective view of a part of a tire having a tread in accordance with the prior art.

FIG. 1 shows a part of the tire 1 having a tread 2 according to the prior art. As can be seen, the tread 2 has a tread surface 20 and grooves 21. On account of the laser sintering method used, the entire tread surface 20 has level lines 4.

Figure 2:
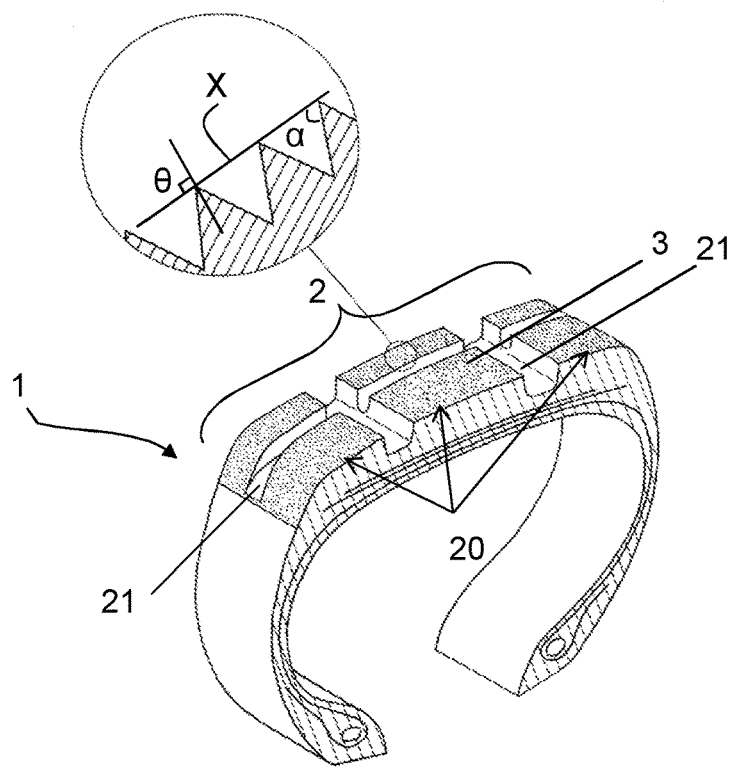
FIG. 2 schematically shows a perspective view of a part of a tire having a particular texture on the surface of the tread, according to the invention.

FIG. 2 shows a part of the tire 1 having a tread 2 according to the invention. The tread 2 has a tread surface 20 and grooves 21. The tread surface 20 has, over at least 80% of its surface, a texture 3 contrasting with the rest of the tire 1, notably the sidewall of the tire 1. In the example illustrated, the texture 3 extends over the entire tread surface 20 and conceals all of the level lines 4.

According to a first non-limiting embodiment of the texture 3, the texture 3 comprises a plurality of elements that protrude from the tread surface 20. The effect of these protruding elements is to "trap" a large amount of the incident light rays that strike the texture 3. In this first embodiment, the texture 3 (known as "velvet") makes it possible to obtain not only a visual appearance of the "velvet" type since the protruding elements absorb light and thus make the tread surface 20 blacker, but also a touch of the "velvet" type, said protruding elements providing a tread surface 20 that is pleasant to the touch.

Furthermore, according to one non-limiting variant embodiment, at least 30% of the protruding elements of the texture 3 form an angle α of greater than 40° with respect to a plane X tangent to the tread surface, and at most 25% of the protruding elements of the texture form an angle α of less than 20° with respect to the tangent plane X. The protruding elements, said tangent plane X and said angle α are illustrated schematically in the zoomed-in part of the texture 3 in FIG. 2. It will be noted that the angle α is the angle between the tangent plane X and the side of the protruding elements. This variant is applicable to the protruding elements 6 and 7 described below.

Figure 3:
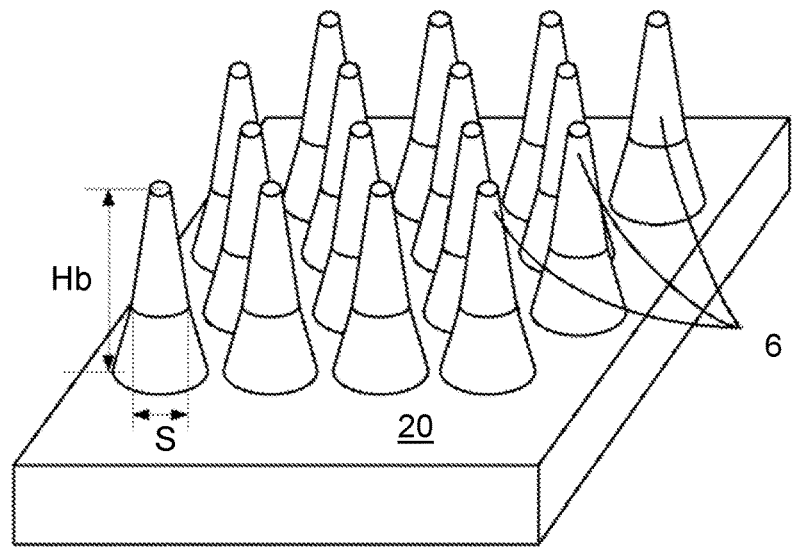
FIG. 3 shows a part of the texture from FIG. 2, according to a first non-limiting variant embodiment of a first embodiment of said texture, according to which the texture has protruding elements.

FIG. 3 illustrates the texture 3 according to a first non-limiting variant embodiment of the first embodiment. In this variant, all or some of the protruding elements are strands 6 distributed through the texture 3 at a density at least equal to one strand per square millimeter (mm²), each strand having a mean cross section S of between 0.003 mm² and 1 mm² It will be noted that the mean cross section of each strand corresponds to the mean of the cross sections S measured at regular intervals from the base of the strand. The strands 6 have a conical overall shape with a cross section that decreases over the height Hb of these strands.

Figure 4:
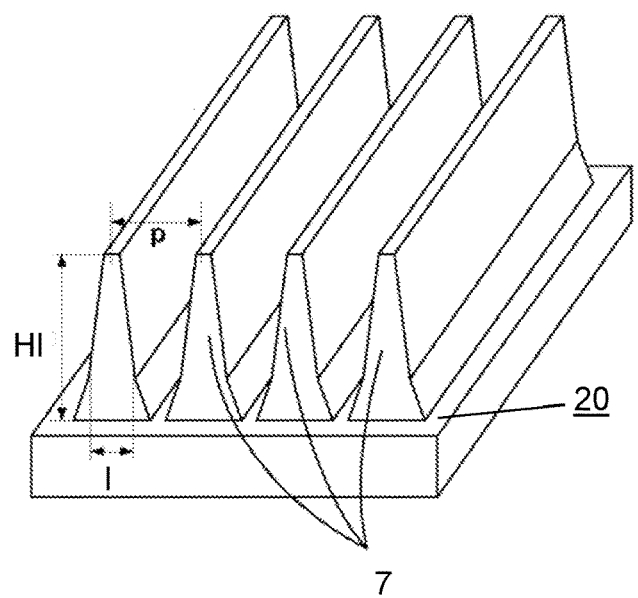
FIG. 4 shows a part of the texture from FIG. 2, according to a second non-limiting variant embodiment of a first embodiment of said texture, according to which the texture has protruding elements.

FIG. 4 illustrates the texture 3 according to a second non-limiting variant embodiment of the first embodiment. In this variant, all or some of the protruding elements are substantially mutually parallel lamellae 7, the spacing P of the lamellae in the texture being between 0.1 mm and 0.5 mm, each lamella 7 having a mean width of between 0.03 mm and 0.25 mm. It will be noted that the mean width corresponds to the mean of the widths 1 measured at regular intervals over the height H1 of the lamella, the height of each lamella being between 0.05 and 0.5 mm.

In another variant embodiment, the texture has a combination of strands 6 and lamellae 7.

Figure 5:
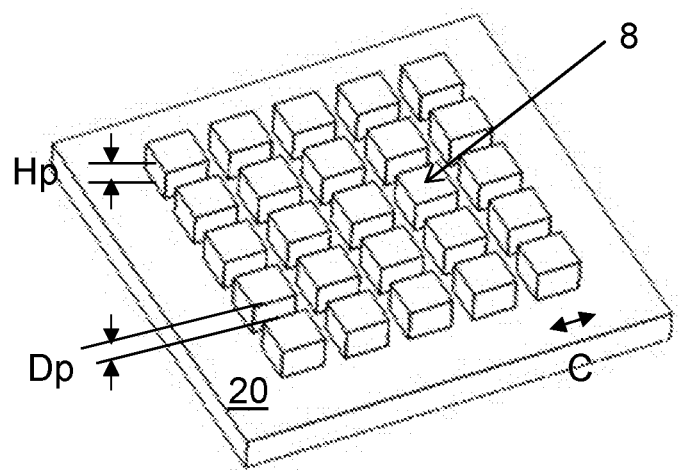
FIG. 5 shows a part of the texture from FIG. 2, according to a third non-limiting variant embodiment of a first embodiment of said texture, according to which the texture has protruding elements.

FIG. 5 illustrates the texture 3 according to a third non-limiting variant embodiment of the first embodiment. In this variant, all or some of the protruding elements form parallelepipeds 8 having a side length C of between 0.05 mm and 0.5 mm and a height Hp of between 0.05 mm and 0.5 mm, the distance Dp between two adjacent parallelepipeds 8 in the texture being between 0.05 mm and 0.5 mm.

In another variant embodiment, the texture has a combination of elements in relief 6, 7 and 8, or 6 and 8, or 7 and 8 described above.

Figure 6:
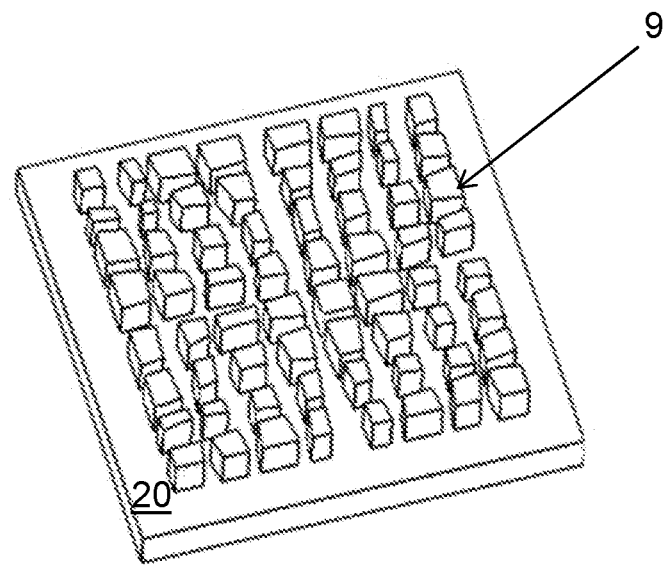
FIG. 6 shows a part of the texture from FIG. 2, according to a fourth non-limiting variant embodiment of a first embodiment of said texture, according to which the texture has protruding elements.

FIG. 6 illustrates the texture 3 according to a fourth non-limiting variant embodiment of the first embodiment. In this variant, the protruding elements 9 have variable shapes and distances between protruding elements in the texture 3. This variant makes it possible to render the elements protruding from the texture 3 less visible.

According to a second non-limiting embodiment of the texture 3, the texture 3 comprises a plurality of elements 10 (also known as holes) that are recessed into the tread surface 20. The recessed elements 10 are made up of openings 11 in the tread surface 20, and of associated cavities 12 extending into the depth of the tread surface 20.

Thus, the texture 3 comprises a plurality of openings 11 in the tread surface 20, said openings 11 being distributed through the texture 3 at a density at least equal to one opening per square millimeter (mm²) and having, at the tread surface, equivalent diameters Dt of between 0.03 mm and 1.2 mm.

In one non-limiting embodiment, the openings 11 occupy at least 30% of the texture 3.

According to other non-limiting embodiments, the openings 11 occupy at least 50% of the texture 3, or even more than 70%. It will be noted that the greater the rate of occupation of the texture by the openings, the better the concealment of the level lines brought about by the moulding method is, and the better this texture contrasts with the rest of the tread.

The openings 11 continue into the depth of the tread surface 20 to form cavities 12.

The effect of these cavities 12 is to "trap" a large amount of the incident light rays that strike the texture 3, but also to make the texture 3 more durable. Specifically, since the cavities 12 are recessed into the tread surface 20, the impact of mechanical attack on the texture, such as rubbing by a road surface, is lower than for protrusions. In this second embodiment, the texture 3 (known as "velvet") makes it possible to obtain a visual appearance of the "velvet" type since the cavities absorb light and thus make the tread surface 20 blacker.

In one non-limiting embodiment, all or some of the cavities 12 have a depth at least equal to 0.1 mm. In one non-limiting variant embodiment, all or some of the cavities 12 have a depth of between 0.2 mm and 0.6 mm. This ensures that a large amount of incident light rays that strike the texture 3 are trapped by said texture and, since the depth of the cavities is limited, also prevents the mechanical strength of the tread surface 20 from deteriorating excessively.

Figure 7:
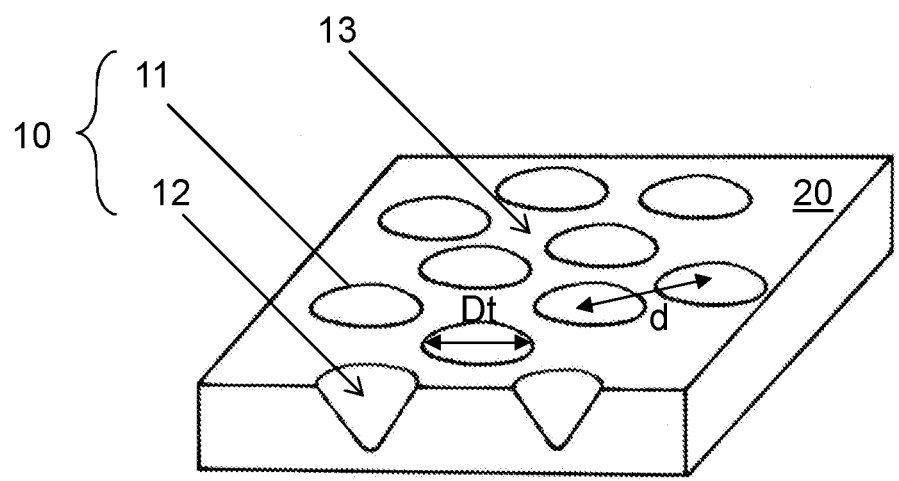
FIG. 7 shows a part of the texture from FIG. 2, according to a second embodiment of said texture, according to which the texture has recessed elements.

FIG. 7 illustrates the texture 3 according to a first non-limiting variant of this second embodiment. In this variant, all or some of the cavities 12 are in the form of cones which extend into the depth of the tread surface 20 and lead onto the tread surface, forming circular openings 11. The cavities 12 thus have a cross section which decreases with depth into the tread surface 20. This improves the contrast of the texture 3 and thus of the tread surface 20 with respect to the rest of the tread 2. It will be noted that in this variant, the openings 11 of the cavities 12 are not in contact. The openings 11 are separated by intermediate regions 13. Moreover, the openings 11 are distributed regularly over all or some of the tread surface 20 such that the distance d between each opening in the texture is similar overall.

Figure 8:
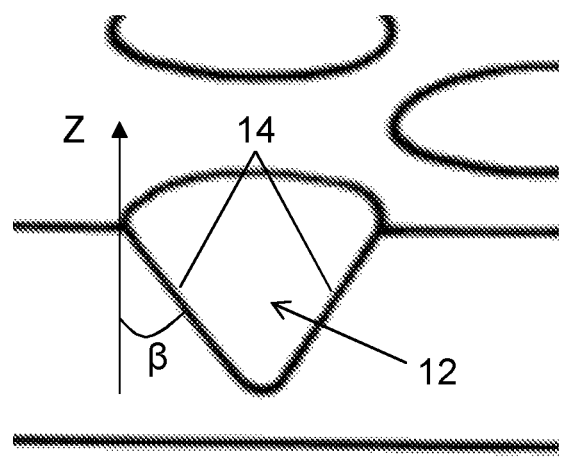
FIG. 8 shows an enlarged view of a cavity of a recessed element of the texture from FIG. 7.

FIG. 8 is a zoomed-in view of a cavity 12 of a recessed element 10 of the texture from FIG. 7. In one non-limiting embodiment, all or some of the cavities have at least one wall 14 which, in cross section, forms an angle β of between 10° and 60° with respect to a direction Z perpendicular to the texture 3.

Each time a light ray strikes a wall 14 of the cavity 12, this ray is reflected by said wall 14. The direction of reflection of the light ray depends on the initial direction of this light ray and on the inclination angle of the wall 14. Thus, depending on this initial direction and on this inclination angle, the light ray can be sent towards another wall 14 of the cavity. By contrast, the light ray can be sent to the outside of the cavity, for example directly towards an observer. In the first case, the light ray is "lost" in the cavity and will no longer be perceptible to an observer. In the second case, the observer can perceive the light ray and the texture can then appear to be lighter and thus to contrast less with the rest of the tread. Choosing a cavity 12 having at least one wall 14 which forms an angle β of between 10° and 60° ensures that a large part of the light rays entering the cavity 12 will be absorbed by this cavity under the effect of multiple reflections inside the cavity. This improves the contrast of the texture 3 (and thus of the tread surface 20) with respect to the rest of the tire 1 (notably with respect to the sidewall), while preserving the same rate of occupation of the texture by the cavities. Moreover, with this wall inclination, the strength of the texture is improved overall, notably in the event of repeated rubbing against the road surface.

The invention is not limited to the examples described and shown and various modifications can be made thereto without departing from its scope.

Thus, according to another non-limiting variant embodiment, the lamellae 7 from FIG. 4 can be discontinuous. They have a flat part between one another. They can also have cross-sectional differences between one another. In addition, the lamellae can have curves or angles, notably along their length. They can also have a variable length.

Thus, according to another non-limiting variant embodiment, the openings 11 can have a circular, square or polygonal (for example hexagonal) shape and the corresponding cavities 12 can have a cylindrical, parallelepipedal or polygonal shape. With these two latter structures (square or polygonal), it is possible to more easily organize the openings 11 with respect to one another so as to limit the area of the intermediate regions 13 between these openings. With such opening shapes, it is easier to achieve consistent rates of occupation of the openings.

Figure 9:
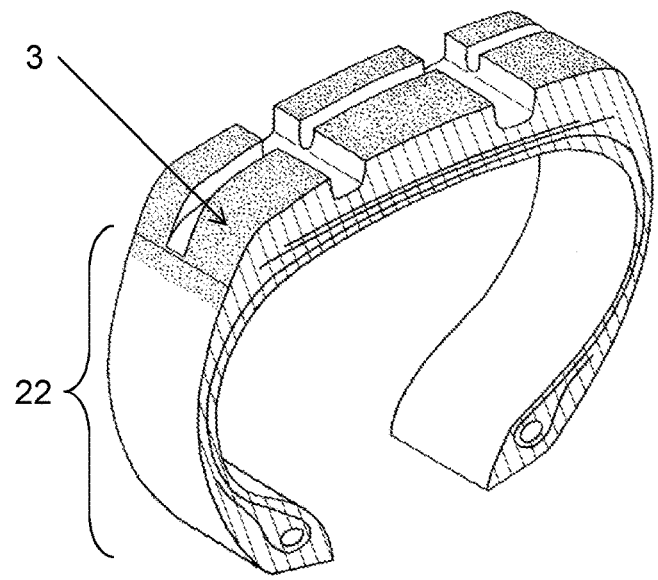
FIG. 9 presents a fifth variant embodiment in which the texture extends onto a sidewall of the tire from FIG. 2.
Figure 10:
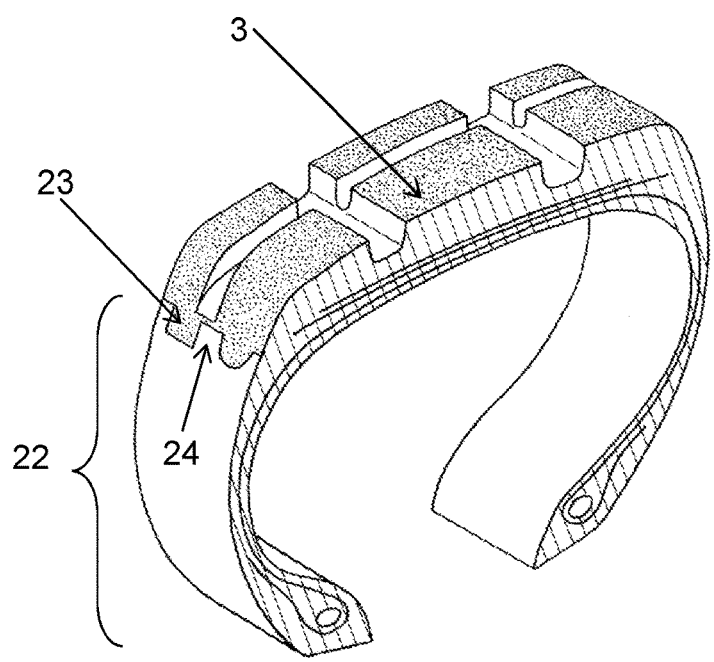
FIG. 10 presents a sixth variant embodiment of the invention.

FIGS. 9 and 10 present variant embodiments in which the texture 3 continues onto a part of the sidewall 22 of the tire. In FIG. 10, the texture 3 continues so as to form textured regions 23 interrupted by non-textured regions 24, so as to form means for indicating overload and/or underinflation. The textured regions 23 of the sidewall can have a particular geometric shape so as to make it easier to see these means for indicating overload and/or underinflation.

Thus, the invention described has notably the following advantages:

The texture 3 makes it possible to conceal the level lines on the tread surface;

The texture 3 (regardless of whether it has protruding elements and/or recessed elements) makes it possible at the same time to absorb light and thus to give the tread surface 20 a blacker appearance compared with the rest of the tread 2. This improves the contrast of the tread surface 20 with respect to the rest of the tread; and The texture 3 makes it possible to obtain an appearance of the tread surface 20 and/or a touch that is pleasant at the tread surface 20, of the "velvet" type.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire made of rubber material, comprising:
a tread having a tread surface adapted to come into contact with a road surface when the tire is being driven on,
the tread surface having, in cross section, a certain curvature,
wherein the tread surface comprises, over at least 80% of its surface, a texture contrasting with the rest of the tire, the texture having a plurality of elements that protrude from or are recessed into the tread surface,
wherein each element extends perpendicularly ($\theta=90°$) to the tread surface along the curvature of this tread surface, and
the texture has a lightness, known as first lightness $L^*1$, of between 6 and 15, and the rest of the tire has a lightness, known as second lightness $L^*2$, greater than or equal to 18 and less than or equal to 30.

2. The tire according to claim 1, wherein at least 30% of the protruding elements of the texture form an angle $\alpha$ of greater than 40° with respect to a plane tangent to the tread surface, and wherein at most 25% of the protruding elements of the texture form an angle $\alpha$ of less than 20° with respect to the tangent plane.

3. The tire according to claim 1, wherein all or some of the protruding elements are strands distributed through the at a density at least equal to one strand per square millimeter ($mm^2$), each strand having a mean cross section of between 0.003 $mm^2$ and 1 $mm^2$.

4. The tire according to claim 1, wherein all or some of the protruding elements are substantially mutually parallel lamellae, the spacing of the lamellae in the texture being at most equal to 0.5 mm, each lamella having a mean width of between 0.03 mm and 0.25 mm.

5. The tire according to claim 1, wherein all or some of the protruding elements form parallelepipeds having a side length of between 0.05 mm and 0.5 mm and a height (Hp) of between 0.05 mm and 0.5 mm, the distance between two adjacent parallelepipeds in the texture being between 0.05 mm and 0.5 mm.

6. The tire according to claim 1, wherein the protruding elements have variable shapes and distances between protruding elements in the texture.

7. The tire according to claim 1, wherein the recessed elements form openings in the tread surface and the texture comprises a plurality of openings, said openings being distributed through the texture at a density at least equal to one opening per square millimeter ($mm^2$), these openings having, at the tread surface, equivalent diameters of between 0.03 mm and 1.2 mm.

8. The tire according to claim 1, wherein the texture present on the tread surface extends onto one sidewall of the tire.

9. The tire according to claim 8, wherein the texture on the sidewall of the tire is configured to provide a visual indication of an overload and/or underinflation of this tire.

10. The tire according to claim 1, wherein the texture has a lightness, known as first lightness $L^*1$, of between 8 and 9.

11. A tire made of rubber material, comprising:
a tread having a tread surface adapted to come into contact with a road surface when the tire is being driven on,
the tread surface having, in cross section, a certain curvature,
wherein the tread surface comprises, over at least 80% of its surface, a texture contrasting with the rest of the tire, the texture having a plurality of elements that protrude from or are recessed into the tread surface,
each element extends perpendicularly ($\theta=90°$) to the tread surface along the curvature of this tread surface,
the texture present on the tread surface extends onto a sidewall of the tire, and
the texture on the sidewall of the tire is configured to provide a visual indication of an overload and/or underinflation of this tire.

12. The tire of claim 11, wherein the texture on the sidewall of the tire is in the form of a plurality of textured regions separated by non-textured regions.

* * * * *